United States Patent [19]

Spurgin et al.

[11] 4,129,475
[45] Dec. 12, 1978

[54] METHOD OF OPERATING A NUCLEAR REACTOR

[75] Inventors: Anthony J. Spurgin, San Diego, Calif.; William F. Schaefer, Pittsburgh, Pa.

[73] Assignee: Westinghouse Electric Corp., Pittsburgh, Pa.

[21] Appl. No.: 600,547

[22] Filed: Jul. 31, 1975

[51] Int. Cl.² .............................................. G21C 7/06
[52] U.S. Cl. .................................. 176/22; 176/19 R; 176/24; 176/38
[58] Field of Search ............... 176/19 R, 19 EC, 19 J, 176/20, 22, 24, 25, 38, 37, 60, 65

[56] References Cited

U.S. PATENT DOCUMENTS

| B 384,330 | 1/1976 | Torres et al. | 176/37 |
|---|---|---|---|
| 3,030,779 | 4/1962 | Hryniszak et al. | 176/65 |
| 3,391,058 | 7/1968 | Gilbert | 176/25 |
| 3,706,921 | 12/1972 | Rosen | 176/22 |
| 3,791,922 | 2/1974 | Musick | 176/20 R |
| 3,860,481 | 1/1975 | Gopal et al. | 176/19 R |
| 3,931,500 | 1/1976 | Berkebile et al. | 176/24 |
| 3,933,580 | 1/1976 | Aleite et al. | 176/24 |

FOREIGN PATENT DOCUMENTS

| 845207 | 8/1960 | United Kingdom | 176/36 |
|---|---|---|---|
| 848521 | 9/1960 | United Kingdom | 176/36 |

OTHER PUBLICATIONS

Control of Nuclear Reactors and Power Plants, Schultz, McGraw-Hill Book Co., Inc. (1955) pp. 61, 252-255.

Fast Reactor Technology: Plant Design (1966) MIT Press, Yevick (ed.) p. 588.

*Primary Examiner*—Samuel W. Engle
*Assistant Examiner*—S. A. Cangialosi
*Attorney, Agent, or Firm*—D. C. Abeles; Z. L. Dermer

[57] ABSTRACT

A method of controlling a nuclear power generating station in the event of a malfunction of particular operating components which minimizes the number of hypothecated occurrences where tripping the reactor might become necessary. Upon identification of such a malfunction, preselected groups of control rods are fully inserted sequentially until a predetermined power level is approached. Additional control rods are then selectively inserted to quickly bring the reactor to a second given power level chosen to be compatible with safe operation of the system with the malfunctioning component. At the same time as the thermal power output of the reactor is being reduced, the turbine is operated at a rate consistent with the output of the reactor. Thus, in the event of a malfunction, the nuclear power generating system is operated in a turbine following reactor mode, with the reactor power rapidly reduced, in a controlled manner, to a safe level compatible with the type of malfunction experienced.

6 Claims, 5 Drawing Figures

METHOD OF OPERATING A NUCLEAR REACTOR

BACKGROUND OF THE INVENTION

This invention pertains generally to methods of operating a nuclear reactor and more particularly to such methods that accommodate adverse operating conditions without tripping the reactor.

Generally, nuclear reactors contain a reactive region commonly referred to as the core in which sustained fission reactions occur to generate heat. The core includes a plurality of elongated fuel rods comprising fissile material, positioned in assemblies and arranged in a prescribed geometry governed by the physics of the nuclear reaction. Neutrons bombarding the fissile material promote the fissionable reaction which in turn releases additional neutrons to maintain a sustained process. The heat generated in the core is carried away by a cooling medium, which circulates among the fuel assemblies and is conveyed to heat exchangers which in turn produce steam to drive a turbine for the production of electricity.

Commonly, in pressurized water reactors a neutron absorbing element is included within the cooling medium (which also functons as a moderator) in controlled variable concentrations to modify the reactivity and thus the heat generated within the core, when required. In addition, control rods are interspersed among the fuel assemblies, longitudinally movable axially within the core, to control the core's reactivity and thus its power output. There are three types of control rods that are employed for various purposes. Full length rods, which extend in length to at least the axial height of the core when fully inserted, are normally employed for reactivity control. Part length control rods, which have an axial length substantially less than the height of the core, are normally used for axial power distribution control. In addition, reaction shutdown control rods are provided for ceasing the sustained fissionable reaction within the core and shutting down the reactor.

In one type of reactor currently in commercial use movement of the part length rods and full length control rods is controlled by magnetic jack mechanisms similar to the jack mechanisms described in U.S. Pat. No. 3,158,766, by E. Frisch which incrementally move the control rods into and out of the core to obtain the degree of reactivity control desired. Generally in this type of arrangement, commonly referred to as rod cluster control, the control rods are inserted and withdrawn from the core in prearranged groups in a preselected order.

In a second type of nuclear reactor the control rod drive mechanisms employ electrically controlled, hydraulically operated devices which individually move control rods between only two rest positions; either full in or full out. Each control rod has at least one neutron absorber element associated with it, approximately the same size as the fuel rods. Each control rod is connected to a hydraulic mechanism and travels in guide thimbles provided within each fuel assembly. In the inserted position, the respective absorber elements fit in corresponding fuel assembly thimbles and in the withdrawn position they are completely removed and located in guide tubes in the reactor head. This type of arrangement is similar to the first type of reactor control arrangement described, except that the control rods employing hydraulic drive do not assume any intermediate positions other than being either fully inserted or fully withdrawn. Each hydraulic control mechanism is a completely independent system and controls the movement of one drive rod which is connected to the absorber rods associated with one control rod. Eight of these independent mechanisms are generally located in a single control assembly. However, each mechanism must have its own hydraulic valve coil and position indicator to operate completely independent of the other seven. For a better understanding of the operation of such a control rod system, reference can be had to U.S. Pat. No. 3,519,535 filed Jan. 24, 1968 by Robert J. French et al entitled "Nuclear Reactor" and U.S. Pat. No. 3,742,409 entitled "Magnetic Position Indicator" by Dean C. Santis et al.

Presently, the probability of reactor trip (the complete cessation of the core reactions) is extremely high in nuclear facilities employing present reactor control systems which manipulate the various sets of control rods in response to the loss of a major reactor component such as a large pump. In fact, in many reactor systems in use to date, the loss of a main reactor coolant pump during operation of the reactor above a preset power level will directly trip the reactor and shut down the plant. However, practically this type of operation is an expensive over-reaction to the malfunction that would not be necessary if the reactor power could be cut back rapidly to a safe level compatible with operation with the malfunctioning component. While desirable, this latter type of operation has been avoided since it would require a complete change in control pholosophy from that presently employed. To date, most reactors derive their power control signals from the load output. A controlled change in reactivity upon the occurrence of a malfunction would require control of the load output as a function of the reactor output to maintain an equilibrium condition.

Accordingly, a reactor control system is desired that is responsive to the occurrence of selective malfunctions of operating components to rapidly reduce the reactor power output and correspondingly control the load output, changing control from a reactor following mode of operation to a load following reactor mode.

SUMMARY OF THE INVENTION

Briefly, this invention provides an improved method of controlling the operation of a nuclear reactor electrical power generating plant in the event of a malfunction in certain operating components. Upon identification of the malfunction the reactor core power is rapidly reduced in a controlled manner to a preselected level compatible with safe operation with the malfunctioning component. Simultaneously, the turbines which are employed to produce electricity respond in accordance with the lower reactor power level to supply a reduced electrical power output.

More specifically, the method of this invention monitors the operation of specified components and provides a corresponding representative electrical output upon the occurrence of a malfunction. The electrical outputs are communicated to a control network which is responsive to the occurrence of a malfunction to sequentially, fully insert prearranged groups of control rods into the core of the reactor until the reactivity of the core is reduced to a first predetermined power level. When the reactor power is reduced to the first predetermined power level the control network selectively inserts the remaining control rods not as of yet inserted fully into the core, according to a designed sequence until the core power level is lowered to a second predetermined value compatible with operation of the plant with the malfunction. The heat removed from the core is controlled as a function of the reduced core power level by adjusting the output load of the plant to establish a steady-state operating condition. Thus, safe operation is maintained with the malfunctioning component without tripping the reactor and completely shutting down the plant.

BRIEF DESCRIPTION OF THE DRAWINGS

For a better understanding of the invention, reference may be had to the preferred embodiment, exemplary of the invention, shown in the accompanying drawings, in which.

DESCRIPTION OF THE PREFERRED EMBODIMENT

Figure 1:
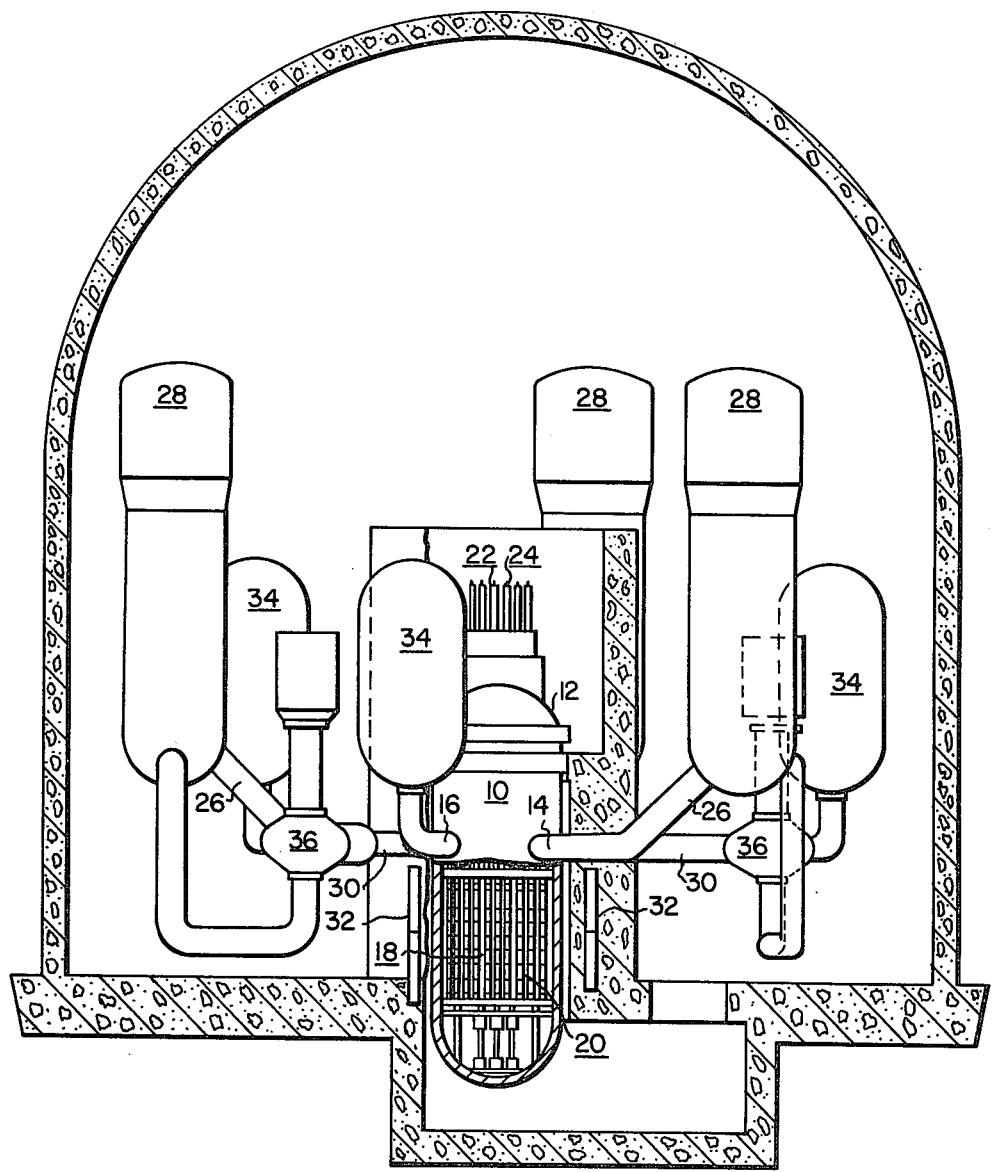
FIG. 1 is a side view, partially in section, of a nuclear reactor steam generating system.

FIG. 1 shows a schematic representation of a typical pressurized water reactor steam generating system which can employ the improved method of operation contemplated by this invention to maintain reduced power operation in the unlikely event of a malfunction of certain operating components without the necessity of tripping the reactor. The reactor of FIG. 1 includes a vessel 10 which forms a pressurized container when sealed by its head assembly 12. The vessel has coolant flow inlet means 16 and coolant flow output means 14 formed integral with and through its cylindrical walls. As is known in the art, the vessel contains a nuclear core 18 including a plurality of clad nuclear fuel elements 20 which generate substantial amounts of heat depending primarily upon the position of the part length 22 and full length 24 control rods previously described. The heat generated by the reactor core 18 is conveyed from the core by coolant flow entering through inlet means 16 and exiting through outlet means 14. Generally the flow exiting through outlet means 14 is conveyed through a hot leg conduit 26, to a heat exchange steam generator system 28, wherein the heated coolant flow is conveyed through tubes which are in heat exchange relationship with water which is utilized to produce steam. The steam produced by the generator is commonly utilized to drive a turbine for the production of electricity. The flow of coolant is conveyed by the reactor main coolant pumps 36 from the steam generator 28 through a cool leg conduit 30 to inlet means 16. Thus, a closed recycling primary or steam generating loop is provided with the coolant piping coupling the vessel 10 and the steam generator 28. In addition, each loop communicates with a pressurizer tank 34 which functions as a reservoir for assuring the desired level of coolant pressure within the reactor. The vessel illustrated in FIG. 1 is adaptable for three such closed fluid flow systems or loops, though, it should be understood that the number of such loops vary from plant to plant and commonly 2, 3, or 4 are employed.

Conventionally, the reactor temperature is monitored as a function of the hot and cold leg temperatures and compared to a reference temperature. When the reactor loop temperature deviates from the reference temperature a control signal which is a function of the electrical generating plant load output is provided to initiate movement of the control rods to readjust the reactivity in the core to correspond to the reference temperature. An example of such a system is more specifically described in U.S. Pat. No. 3,423,285 by Currey et al., entitled "Temperature Control For A Nuclear Reactor". Thus, most nuclear powered electrical generating stations in operation function in this manner in a reactor following turbine mode.

At present, when a large pump, such as one of the main reactor coolant pumps 36 malfunctions, the probability of a reactor trip is extremely high. In fact, if a reactor coolant pump malfunctions when the reactor power is above a certain level the reactor will be tripped directly. This action is taken to prevent damage to the fuel. However, such damage could also be avoided without shutting down the plant if the reactor power could be cut back rapidly enough, in a controlled manner, to a level where the remaining reactor coolant loops in operation could accommodate the thermal power being generated within the core. Complementary control at the plant turbines corresponding to established load programs is also required during this type of operation to establish the steam pressures needed to compensate for the reduced thermal generation of the core.

The steps of the method of this invention enable the nuclear plant to ride through the loss of certain components, such as a main reactor coolant pump, without complete shutdown of the plant by reducing the reactor power rapidly in a controlled manner to a predetermined level corresponding to a safe level of operation with the malfunctioning component. Concurrently with the reduction of reactor power the turbine power is reduced at a rate consistent with the power output of the reactor; thereby changing plant control from a reactor following turbine mode to a turbine following reactor mode.

In accordance with this invention the major components of interest which are likely to cause a reactor trip in the event of a malfunction, i.e. the main reactor coolant pumps, the steam generator feedwater pumps, and the condensate pumps, are monitored and a corresponding representative electrical output is generated upon the occurrence of a malfunction. The generation of such an electrical response representative of the identification of a particular malfunction initiates a change from conventional reactor control to control as prescribed by the steps of this invention. The deviation in actual nuclear power as determined by the plant excore detectors 42 illustrated in FIG. 1, from a reduced preselected power level chosen to be compatible with operation with the malfunctioning component, is determined and governs the rate of control rod insertion into the reactor core to rapidly reduce the reactivity of the core to a corresponding level. Two power setpoints are preselected, a final desired power level and an intermediate objective. If the deviation indicates that the actual reactor power is above the intermediate objective, prearranged groups of control rods are fully inserted into the core, sequentially, until the reactor power is brought below the intermediate set power level. Between insertion of each of the prearranged groups of control rods the steps of this invention enforces a predetermined time delay to detect whether the objective power level has been reached. Thereafter, preselected control rods, not yet completely within the core, are inserted according to a designed sequence to further reduce the power level of the core to correspond to the final desired power level. Thus, coarse rapid power reduction is accomplished by full insertion of the control rod groups until the core power is reduced to the intermediate power level and then fine power control is initiated until the final power objective is achieved. At the same time as the reactor control system is changed, control of the turbine is also changed. During normal operation the turbine load is set manually or by the load dispatch system, or in emergencies by the grid frequency. Where the steps of this invention are implemented the turbine power level is determined by a comparison between the actual steam pressure and a desired steam pressure which is predetermined to correspond to the reduction in reactor power output.

Figure 2:
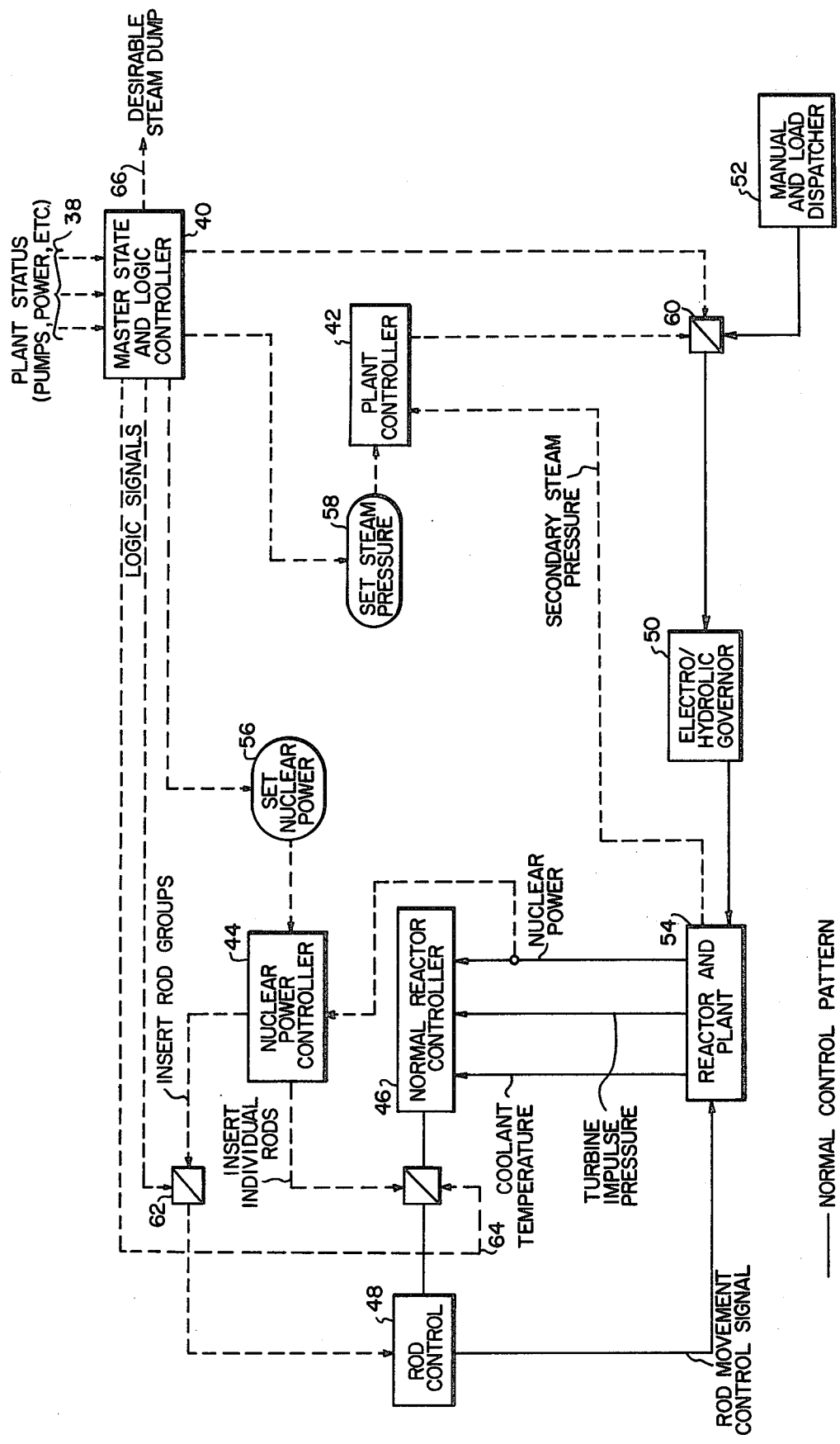
FIG. 2 is a schematic illustration of an arrangement of nuclear and plant control balances.

FIG. 2 shows a schematic arrangement of nuclear and plant control balances. Conventional control patterns are shown by solid lines with the additions for rapid power reduction as provided by the steps of the method of this invention shown in dotted form. Conventionally, as previously explained, the turbine output power is set manually or by the load dispatcher 52 which controls an electrohydraulic governor 50 associated with the turbine. The reactor and electrical generating plant 54 is monitored for the actual nuclear power obtained from the excore detectors; the turbine power, determined from the impulse pressure derived from the first turbine stage; and the reactor coolant temperatures, derived from the reactor coolant loops. Corresponding monitoring signals are communicated to the reactor controller 46, which can be a system similar to that described in the aforecited Curry et al. patent. The controller 46 generates a corresponding control signal which is communicated to a rod control sequencer 48, which is a system similar to the systems described in U.S. Pat. Nos. 3,654,607 and 3,654,608, which governs the insertion of the control rods into the reactor to establish the desired reactivity level corresponding to the load output set by the manual and load dispatcher unit 52.

In accordance with this invention the signals derived from monitoring critical reactor and plant components for malfunctions are communicated to a master state and logic controller 40. The logic controller 40 is programmed with a number of preselected setpoints which correspond to the type of malfunctions being monitored and which are employed to set the desired nuclear power levels and steam pressure levels when a malfunction is experienced. Upon identification of a particular malfunctioning component the logic controller 40 reorganizes the reactor and plant control system via switching modules 60, 62 and 64 to disconnect the manual and load dispatcher 52 and the normal reactor controller 46 and connect the plant controller 42 and nuclear power controller 44 so that the turbine system via the electrohydraulic governor 50 is responsive to the plant controller 42, and the rod control system 48 is responsive to the nuclear power controller 44. At the same time, the master controller activates the setpoints 56 and 58 corresponding to the malfunction identified. The nuclear power setpoints 56 include an intermediate setpoint and a final setpoint which correspond to the desired power output of the reactor. The steam pressure setpoint is derived from the reactor setpoints by a well-known relationship to establish a turbine output compatible with the reduced reactor power level. Both the final nuclear reactor power setpoint and steam pressure setpoint are part of the designed operating parameters of nuclear power plants. During some malfunctions it is desirable to provide an additional control signal 66 to disconnect the steam dump conventionally employed to bypass excess steam around the turbine directly to the condensers.

Figure 3:
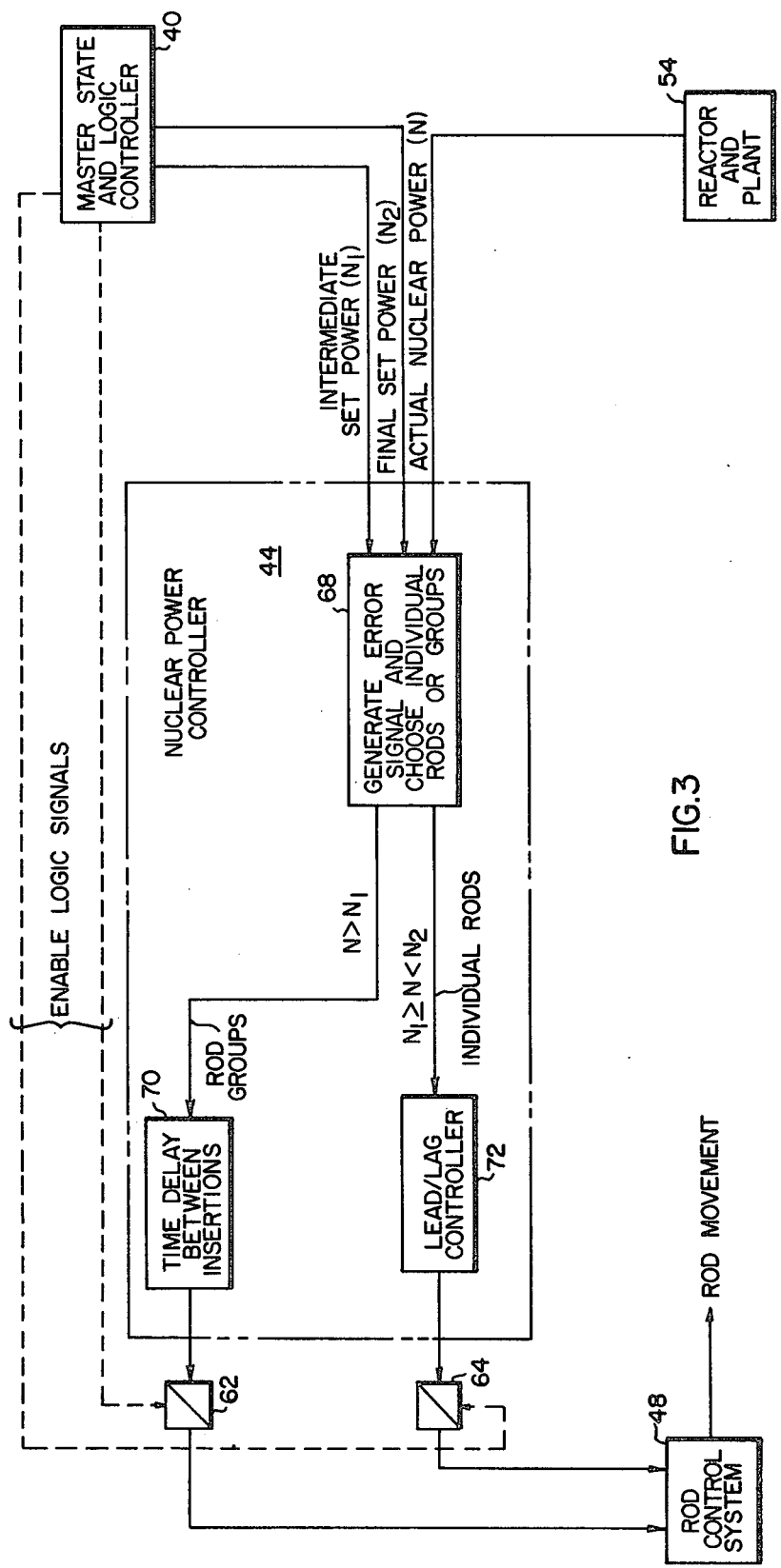
FIG. 3 is a schematic illustration of a nuclear power controller such as the one illustrated in block form in FIG. 2 which can be used to effect the steps of the method of this invention.

Once the master state and logic controller has activated the nuclear power controller 44 and plant controller 42 in response to a malfunction as just described, the nuclear generating station control is changed from a reactor following turbine mode to a turbine following reactor mode as will be appreciated from the following discussion. The nuclear power controller 44, once enabled, compares the actual nuclear power with the final and intermediate setpoints illustrated in FIG. 3. Block 68 compares the actual nuclear power signal N with the intermediate power setpoint $N_1$ and the final power setpoint $N_2$ using conventional components such as differential amplifiers and comparator circuits. If the actual power is greater than the intermediate power setpoint, circuitry block 68 provides an activating signal to circuitry block 70, which after a small time delay instructs the rod control system 48 to fully insert a prearranged group of control rods into the reactor core. The delay is provided to enable the reactor to respond to the new power level resulting mainly from insertion of a given group of control rods before the next prearranged group of control rods is inserted. If after insertion of the first group of control rods the actual reactor power is still above the intermediate set power, additional groups of control rods are sequentially inserted until the reactor power is brought below the intermediate power setpoint $N_1$. The moment the actual nuclear power is reduced below the intermediate setpoint circuitry block 68 shifts control to the controller 72, which is of the conventional lead/lag type, which finely lowers the reactor power to the ultimate desired power level $N_2$ by selectively inserting the remaining control rods not as yet fully inserted. A lead/lag controller is employed to compensate for transients induced by control rod movement.

Previously, two distinct types of control rod operation were described for controlling the normal operation of the reactor. Conventionally, in rod cluster control movements groups of rods are moved incrementally to obtain a particular desired reactor output. In the second type of rod movement, the control rods are individually operated under hydraulic control being either fully inserted or fully withdrawn. The method of this invention is operable with both types of systems with only slight modification required. For the hydraulically operated type of system it is convenient to release four, eight, or more rods as a group. Between the release of one set of rods and the next rod group, the controller 70 enforces a delay to ensure that the reactor power does not overshoot below the intermediate setpoint $N_1$. Once the nuclear power reaches a level which is equal to or less than the intermediate setpoint $N_1$ the control rods are no longer dropped into the core in groups, and individual rods are inserted into the core one at a time as instructed by the lead/lag controller 72 which determines when a rod is to be inserted and the rod control system 48 which specifices which rod is to be inserted until power reduction is completed to the desired final power level $N_2$. In systems employing rod cluster control the rod controller 48 normally employed would have to be modified slightly to identify particular groups to be fully inserted into the core in response to the intstructions of the rod group controller 70. Once the reactor ppower level has been brought to a level equal to the intermediate setpoint the rod controller 48 can operate in a conventional manner in response to a control signal from the lead/lag controller to move a particular group of rods incrementally in the core to obtain fine reactor power control to bring the reactor power level to the desired operating level $N_2$. Desirably, the intermediate power setpoint $N_1$ is chosen at a value above the final setpoint $N_2$ approximately equal to the power reduction resulting from the full insertion of one group of rods.

Figure 4:
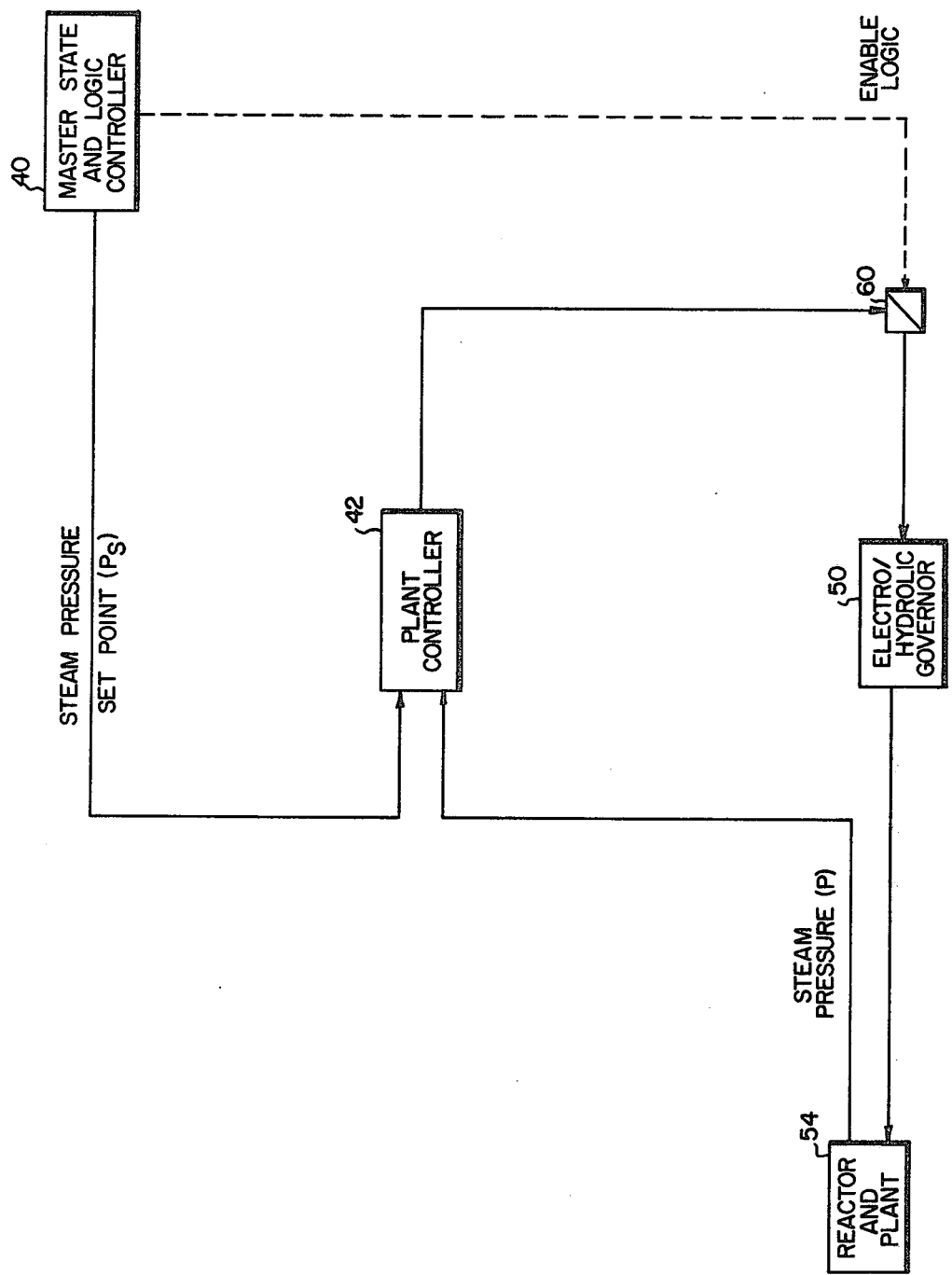
FIG. 4 is a schematic illustration of a plant controller which can be employed in the arrangement of FIG. 2 to effect the steps of the method of this invention.

Concurrently with the reduction in nuclear power the turbine power is adjusted until the steam pressure reaches a preselected value. FIG. 4 illustrates a schematic of a plant controller for implementing the reduction in turbine power. Upon reception of a monitored signal identifying a particular malfunction the manual and load dispatcher action is inhibited and the plant controler 42 is enabled through gate 60. The steam pressure setpoint corresponding to the particular malfunction identified by the master state and logic controller 40 is supplied to the plant controller 42 which compares the setpoint against the actual steam pressure monitored at the (steam header) first stage of the turbine. First stage turbine pressure is an indirect measure of steam flow, which in accordance with this invention enables control of the steam generator pressure in a manner consistent with the plant load program. The plant controller responds to the difference between the actual and setpoint pressure to provide a control signal to the electrohydraulic governor 50 to reduce the turbine output to a level consistent with the reduced reactor output. In this instance, the setpoint for the steam pressure can be either a constant corresponding to the ultimate turbine output desired which corresponds to the final power setpoint $N_2$ or a variable which corresponds to the reduction in reactor power as it occurs. In the latter case, the steam pressure setpoint is continually calculated as a function of the actual nuclear power monitored at the excore detectors.

Figure 5:
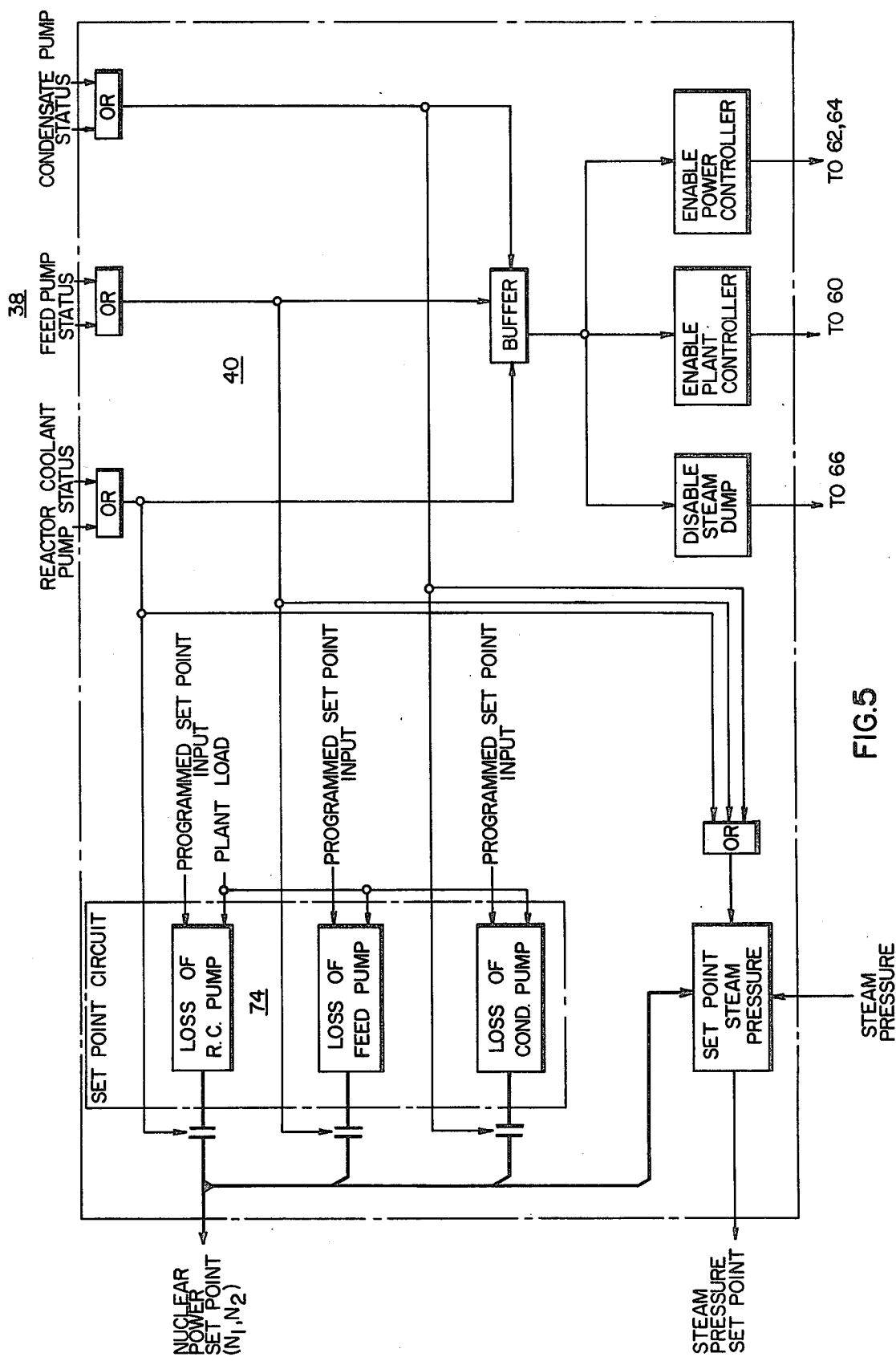
FIG. 5 is a schematic illustation of a master state and logic controller which can be employed in the arrangement of FIG. 2 to effect the method steps of this invention.

FIG. 5 is a schematic of the master state and logic controller. The function of the master state and logic controller 40 is to sense an operational change in the plant as indicated by the monitoring inputs 38. Having sensed the change in the plant status, the master state and logic controller initiates a change in the control system structure and then chooses the correct nuclear power and steam pressure setpoints appropriate to th new condition of the plant. Accordingly, outputs from the respective monitors 38 enable the setpoint circuit 74 to communicate the programmed setpoints to the nuclear power controller and additionally enables the corresponding steam pressure setpoint, which is a function of the desired nuclear power and the actual steam pressure to be communicated to the plant controller. In addition, the monitoring signals 38 enable the power controller through gates 62 and 64, the plant controller through gate 60 and disable the steam dump where appropriate through terminal 66. Once the reduced steady state power level is reached the control system can be returned to its former structure at the new load level. In this way, the method of this invention enables the reactor plant to ride through the loss of certain components without experiencing costly shutdowns of the entire facility.

We claim:

1. A method of controlling the operation of a nuclear reactor in the event of a malfunction in specified operating components, wherein the reactor includes a nuclear core for generating heat, a plurality of control elements movable into and out of the core for controlling the reactivity of the core and heat removal means for cooling the core, comprising the steps of, monitoring the operation of the specified components providing a corresponding representative electrical output upon the occurrence of a malfunction;

completely inserting prearranged control elements in groups sequentially into the core in response to the electrical indication of a malfunction until the reactivity of the core is reduced to a first predetermined power level;

selectively, individually, inserting control elements not yet inserted, according to a designed sequence when the core power level is lowered to the first predetermined power level until the power level of the core is reduced to a second predetermined value which is specificed for the respective components monitored at a corresponding value the reactor can safely operate at during power operation with the respective components out of operation and wherein the first predetermined power level is specified for the respective components at a value above the second predetermined power level, which is less than or equal to the power reduction resulting from the complete insertion of one prearranged group of control elements; and controlling the heat removed from the core by the heat removal means as a function of the reduced core power to substantially maintain the normal operating temperatures of the reactor for power generation.

2. The method of claim 1 wherein a predetermined period of delay is provided between complete insertion of the respective prearranged groups of control elements and insertion of the next of the sequence of groups of control elements.

3. The method of claim 1 wherein the values employed for the first and second predetermined power levels are dependent upon and will vary between the respective specified components malfunctioning.

4. The method of claim 1 wherein the heat removal means communicates with a heat exchanger which is employed to generate steam including the step of controlling the steam pressure to correspond to the second perdetermined power level.

5. The method of claim 1 wherein the heat removal means comprises water which is circulated into and out of the core to a primary side of a steam generator placed in heat exchange relationship with water contained within a secondary side of the steam generator for the generation of steam and a condenser for condensing the steam and wherein the specified components comprise a reactor coolant pump for circulating the water into and out of the core, a feedwater pump for pumping water into the secondary side of the steam generator and a condensate pump for pumping condensed water from the condenser.

6. A method of controlling the operation of a nuclear reactor in the event of a malfunction in specified operating components, wherein the reactor includes a nuclear core for generating heat, a plurality of control elements movable into and out of the core for controlling the reactivity of the core and heat removal means for cooling the core, comprising the steps of, monitoring the operation of the specified components providing a corresponding representative electrical output upon the occurrence of a malfunction;

completely inserting automatically prearranged control elements in groups sequentially into the core in response to the electrical indication of a malfunction until the reactivity of the core is reduced to a first predetermined power level;

automatically, selectively, individually inserting control elements not yet inserted, according to a desired sequence when the core power level is lowered to the first predetermined power level until the power of the core is reduced to a second predetermined value which is specified for the respective components monitored at a corresponding value the reactor can safely operate at during power operation with the respective components out of operation and wherein the first predetermined power level is specified for the respective components at a value above the second predetermined power level, which is less than or equal to the power reduction resulting from the complete insertion of one prearranged group of control elements; and automatically controlling the heat removed from the core by the heat removal means as a function of the reduced core power to substantially maintain the normal operating temperatures of the reactor for power generation.

* * * * *